(12) United States Patent
Naneix

(10) Patent No.: US 10,958,724 B2
(45) Date of Patent: Mar. 23, 2021

(54) ELECTRICAL DISTRIBUTION SYSTEM FOR AN AIRCRAFT AND CORRESPONDING CONTROL METHOD

(71) Applicant: Zodiac Aero Electric, Montreuil (FR)

(72) Inventor: Philippe Naneix, Paris (FR)

(73) Assignee: Zodiac Aero Electric, Montreuil (FR)

( * ) Notice: Subject to any disclaimer, the term of this patent is extended or adjusted under 35 U.S.C. 154(b) by 299 days.

(21) Appl. No.: 14/826,784

(22) Filed: Aug. 14, 2015

(65) Prior Publication Data
US 2016/0050273 A1 Feb. 18, 2016

(30) Foreign Application Priority Data

Aug. 14, 2014 (FR) ...................................... 1457847

(51) Int. Cl.
*H04L 29/08* (2006.01)
*G05B 9/03* (2006.01)

(52) U.S. Cl.
CPC ............ *H04L 67/1095* (2013.01); *G05B 9/03* (2013.01); *H04L 67/12* (2013.01)

(58) Field of Classification Search
CPC ........... G06F 2201/845; G06F 9/30189; G06F 11/183; G06F 11/1658; G06F 11/167;
(Continued)

(56) References Cited

U.S. PATENT DOCUMENTS 6,014,669 A * 1/2000 Slaughter .............. G06F 16/275
707/610
6,243,705 B1 * 6/2001 Kucala .................... G06F 17/30
707/10
(Continued)

FOREIGN PATENT DOCUMENTS

FR  2 909 475 A1  6/2008
WO  99/17201 A1  4/1999
WO  01/082078 A3  11/2001

OTHER PUBLICATIONS

Munns; Power Supply Protection for Aviations and Defense Applications; Feb. 8, 2011; EDN Network (Year: 2011).*
(Continued)

*Primary Examiner* — Tonia L Dollinger
*Assistant Examiner* — Linh T. Nguyen
(74) *Attorney, Agent, or Firm* — Christensen O'Connor Johnson Kindness PLLC

(57) ABSTRACT

Electrical distribution system for an aircraft comprising at least one computer communicating with the avionics (2), at least one computer (1) suitable for communicating with at least one computer communicating with the avionics (2), each computer containing stored data. The system comprises a context information storage device (4), suitable for storing a copy of the data stored in the different computers, and an updating device, suitable for determining that a computer has been replaced by determining that it does not hold the same data as the other computers of the distribution system and/or as the context information storage device (4), the updating device being suitable for controlling the downloading of the data from the context information storage device or from a computer communicating with the avionics, into the replaced computer.

3 Claims, 3 Drawing Sheets

(58) Field of Classification Search
CPC .............. G06F 9/4408; G06F 11/1438; G06F 13/4295; G06F 17/30578; G06F 21/575; G06F 17/30377; G06F 17/30893; G06F 11/1451; G06F 17/30174; G06F 3/065; G06F 11/1469; G06F 11/1641; G06F 17/30371; G06F 17/30581; G06F 17/30952; G06F 11/1448; G06F 11/2094; G06F 3/1415; G06F 11/1675; G06F 11/2058; G06F 11/2082; G06F 11/2064; G06F 16/2365; G06F 16/174; G06F 16/182; G06F 3/0643; G06F 16/273; G06F 16/27; G06F 16/275; G06F 40/194; G06F 11/2097; G05B 15/02; G05B 9/02; H04L 29/12132; H04L 61/1552; H04L 67/1095
USPC ...... 714/12, E11.098, E11.133, E11.138, 10, 714/819; 709/248, 227, 246; 715/229; 707/637, 638, 640, 646, E17.032; 711/162
See application file for complete search history.

(56) References Cited

U.S. PATENT DOCUMENTS

| | | | |
|---|---|---|---|
| 6,360,334 B1 | 3/2002 | Kavanagh et al. | |
| 6,938,258 B1 | 8/2005 | Weinberger | |
| 7,415,486 B2* | 8/2008 | Multer | H04L 67/1095 |
| 7,953,785 B2* | 5/2011 | Li | G06F 16/176 |
| | | | 709/201 |
| 7,970,945 B1* | 6/2011 | Vogel | H04L 67/104 |
| | | | 709/248 |
| 8,156,074 B1* | 4/2012 | Multer | G06F 17/30174 |
| | | | 707/610 |
| 9,471,435 B2* | 10/2016 | Michihata | G06F 9/4401 |
| 2002/0053008 A1* | 5/2002 | Goodman | G06F 11/1417 |
| | | | 711/162 |
| 2003/0149709 A1* | 8/2003 | Banks | G06F 17/30578 |
| 2003/0208579 A1 | 11/2003 | Brady, Jr. et al. | |
| 2004/0172423 A1* | 9/2004 | Kaasten | G06F 16/1787 |
| 2006/0123202 A1* | 6/2006 | Popescu | G06F 11/1633 |
| | | | 711/149 |
| 2008/0027587 A1 | 1/2008 | Nickerson | |
| 2008/0208919 A1* | 8/2008 | i Dalfo | G06F 16/273 |
| 2008/0215639 A1* | 9/2008 | Rifkin | G06F 16/178 |
| 2009/0055674 A1* | 2/2009 | Mueller | G06F 9/30181 |
| | | | 713/375 |
| 2009/0167076 A1 | 7/2009 | Serventi et al. | |
| 2010/0066553 A1 | 3/2010 | Guichard | |
| 2010/0235572 A1* | 9/2010 | Miller | G06F 11/1076 |
| | | | 711/114 |
| 2011/0026513 A1* | 2/2011 | Tien | G06F 16/27 |
| | | | 370/350 |
| 2011/0166749 A1* | 7/2011 | Muirhead | G06F 8/61 |
| | | | 701/36 |
| 2013/0031413 A1* | 1/2013 | Righi | G06F 11/1417 |
| | | | 714/37 |
| 2013/0297928 A1 | 11/2013 | Wyss | |
| 2014/0258257 A1 | 9/2014 | Schowalter et al. | |
| 2014/0372878 A1* | 12/2014 | Zhou | G06F 17/24 |
| | | | 715/256 |
| 2014/0379649 A1* | 12/2014 | Lee | G06F 17/30174 |
| | | | 707/626 |
| 2015/0102663 A1* | 4/2015 | Brouwer | B60R 16/0238 |
| | | | 307/9.1 |
| 2015/0254067 A1* | 9/2015 | Nigam | H04L 41/0843 |
| | | | 717/175 |
| 2015/0269041 A1* | 9/2015 | Long | G06F 3/065 |
| | | | 714/4.11 |

OTHER PUBLICATIONS

D. Elwell et al.; Avionic Data Bus Integration Technology; Dec. 1991, pp. 1-233 (Year: 1991).*
French Search Report, dated Apr. 20, 2015, issued in corresponding French Patent Application No. 1457847, filed Aug. 14, 2014, 2 pages.
UK Patents Act 1977: Search Report Under Section 17(5), dated Feb. 11, 2016, in corresponding Application No. GB 1514134.4, 4 pages.

* cited by examiner

ELECTRICAL DISTRIBUTION SYSTEM FOR AN AIRCRAFT AND CORRESPONDING CONTROL METHOD

The technical field of the invention is the electrical distribution systems for aircraft, and more particularly the control of such systems.

The computers installed in the electrical distribution boxes make it possible to store a lot of information on the characteristics of the electrical distribution lines intended to supply power to the different loads and equipment items of the aeroplane. Such information is of different kinds, notably not safety-related (label of the equipment item powered, line status), safety-related (line active or inactive, protection tripped) or critical (line rating, activation of specific protection). Some of these data, like the activation of protection or the deactivation of a line can be modified by the system in real time automatically when the system is operating or upon intervention by maintenance operatives.

The computers are themselves line-replaceable units LRU, that can be replaced by the maintenance operatives when the units have failed or simply during an operation tracing faults affecting different systems. The computers are also interchangeable within one and the same function to offer flexibility of operation and to minimize the stock of material stored in the maintenance workshops. Now, during these computer dismantling/reassembly or swap-out operations, the configuration and context information that the computers contained in the functional location where they were located is not compatible with the new placement where they are reinstalled. In the particular case of new computers, these contain only default data corresponding to a hypothetical delivery configuration.

In all cases, when the computers are installed in an aeroplane, it is absolutely necessary to load into the reinstalled computers data that is identical to the data contained in the uninstalled computers, before powering up the aeroplane, so as not to risk powering lines which should not be powered or doing so with inappropriate protection.

For this, different operations can be performed in a preparatory manner in the workshop or directly on the aeroplane.

More specifically, all of the constituent data of the aeroplane corresponding to the delivery configuration of the aeroplane are downloaded in the workshop, from a database, called a configuration database.

This information defines the installation and the characteristics of the distribution elements (rating, functional identifier, available protections that can be activated, etc.).

On the other hand, this information does not contain the operational information such as the protections which have been tripped in a previous use or lines taken out of service by maintenance operatives, to perform a specific operation on the aeroplane wiring or on the loads. This information is of a safety nature and must absolutely be restored identically after an LRU computer is replaced to avoid the risk of creating an electrical fault or injuring an operative. Without an automatic system, this information has to be restored by hand on the basis of previous intervention sheets to recreate the historical context of use with the risk of error inherent in this type of method.

Another technique consists in, prior to the removal of a computer, the maintenance operative recovering, with a dedicated tool, the information stored therein to download it into the new computer that is to be installed. The downloading of the data on the aeroplane is performed by the duplication of data extracted from the non-replaced subassemblies.

This operation assumes that the replacements are done in sequence with a lot of care and can be the source of errors in the case where there are a lot of computers to be replaced. The overall time taken for the intervention can rapidly become significant if the number of subassemblies to be replaced is itself significant.

Moreover, this also assumes that the computers remain accessible to perform a data transfer whereas, more often than not, these operations are performed precisely because one of the computers is not, or is no longer, operating.

Another technique consists in storing all of the information on the avionics in as much as the latter then has total visibility of the configuration and of the state of the electrical system. Given that all of the information is uploaded to the avionics via digital bus, by symmetry, the data can be downloaded into the corresponding LRU computers so as to initialize the data and the context that existed before the assembly/disassembly of the subassemblies.

The major drawback with this technique less in the fact that, to successfully complete this operation, the aeroplane and its avionics must be powered down for the downloading time. During this time, the electrical distribution protection management computers are in a default configuration which can render them inoperative or ineffective. Furthermore, for the duration of the operation, the aeroplane is not useable and the downtime can be relatively lengthy.

An additional technique consists in distributing or duplicating the information contained in the LRU computers in the computer or computers of the electrical distribution system, dedicated to communication with the avionics, to be able to redownload all of the data into the computer which has just been installed. The benefit of this technique lies in the fact that the electrical system is autonomous and can be powered only in a reduced manner to perform this maintenance operation and that no specific tools or data media are necessary.

On the other hand, the computers dedicated to communication with the avionics are themselves line-replaceable computers (LRU). Depending on the combination of the subassemblies changed, this can culminate in a loss of information or an overwriting of data from one computer to another. In effect, on each computer, it is impossible to know which holds the correct information.

A final technique similar to the preceding one uses an LRU dismantling/reassembly detection device. When this device is activated, any new replaced LRU board is detected as such, and the context data transfer mechanism is started for the LRU computer newly installed or upgraded to the same functional level as that which has just been removed.

The subject of the invention is an electrical distribution system for an aircraft comprising at least one computer communicating with the avionics of the aircraft, at least one computer suitable for communicating with at least one computer communicating with the avionics, each computer containing stored data. The system comprises a context information storage device, suitable for storing a copy of the data stored in the different computers, and an updating device, suitable for determining that a computer has been replaced by determining that it does not hold the same data as the other computers of the distribution system and/or as the context information storage device, the updating device being suitable for controlling the downloading of the data from the context information storage device or from a computer communicating with the avionics, into the replaced computer.

If a computer suitable for communicating with at least one computer communicating with the avionics is replaced by a new computer, the updating device can be suitable for controlling the downloading of the data from the computer communicating with the avionics to the new computer.

If a new computer communicating with the avionics replaces a computer communicating with the avionics, the updating device can be suitable for controlling the downloading of the data from the context information storage device to the new computer communicating with the avionics.

If a new context information storage device replaces a context information storage device, the updating device can be suitable for controlling the downloading of the data from the computer communicating with the avionics to the new context information storage device.

The downloaded data can be the protection parameters defining the electrical protections and their activation history for at least one electrical power supply line of the aeroplane.

Another subject of the invention is a method for controlling an electrical distribution system for an aircraft comprising at least one computer communicating with the avionics of the aircraft, at least one computer suitable for communicating with at least one computer communicating with the avionics, each computer containing stored data and a context information storage device, suitable for storing a copy of the data stored in the different computers. The method comprises the following steps:

the data contained in each computer is determined, it is determined that a computer has been replaced by comparing the data of the computers in order to determine whether a computer contains different data from the other computers, and if such is the case, the data is downloaded from the context information storage device or from a computer communicating with the avionics into the replaced computer.

If it has been determined that the electrical distribution computer has been replaced by a new electrical distribution computer not containing the same data as the other computers, it is possible to command the downloading of the data from the computer communicating with the avionics into the new electrical distribution computer.

If it has been determined that the computer communicating with the avionics has been replaced by a new computer communicating with the avionics, and that neither the electrical distribution computers nor the context information storage device have been exchanged, it is possible to command the downloading of the data from the context information storage device into the new computer communicating with the avionics.

If it has been determined that the context information storage device has been replaced by a new context information storage device and that neither the electrical distribution computers nor the computer communicating with the avionics have been exchanged, it is possible to command the downloading of the data from the computer communicating with the avionics into the new context information storage device.

DESCRIPTION OF THE DRAWINGS

Other aims, features and advantages of the invention will become apparent on reading the following description, given purely as a nonlimiting example and with reference to the attached drawings in which.

DETAILED DESCRIPTION

Figure 1:
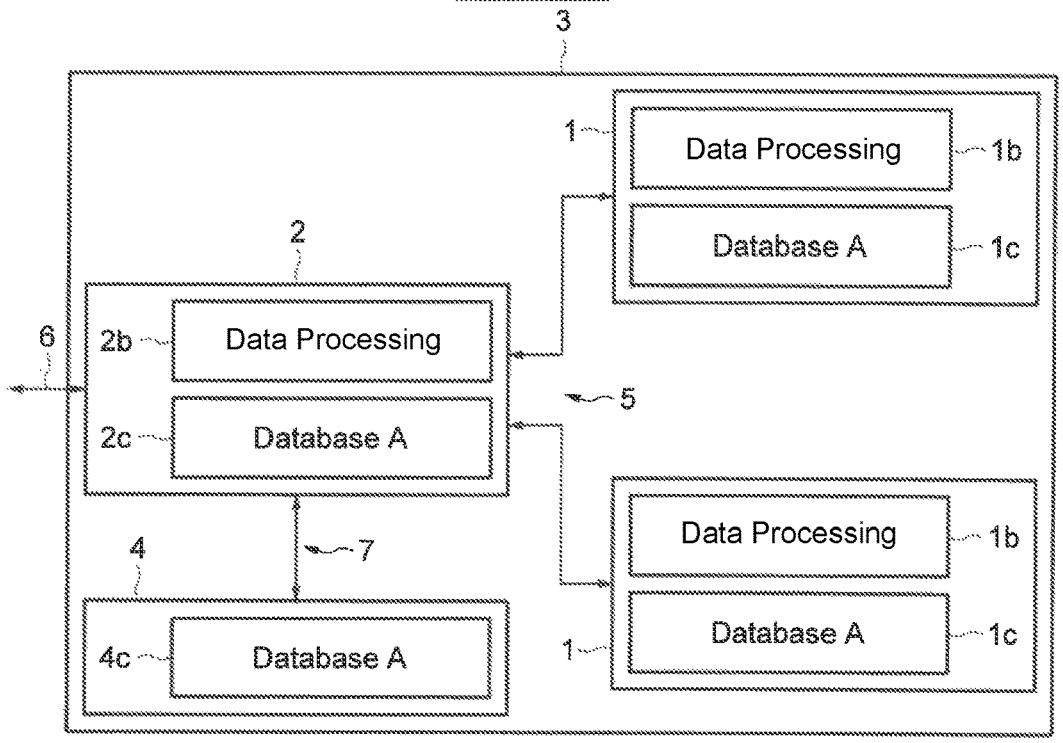
FIG. 1 illustrates an electrical energy distribution system.

In FIG. 1, an electrical energy distribution system can be seen that comprises electrical distribution computers 1, which ensure the switching and the protection of one or more energy distribution lines, each connected by an internal bus 5 to one or more computers communicating with the avionics 2 which take charge of all the communication via the avionics bus 6 with the avionics computers for the attention of the pilot or of the maintenance operatives.

All of these computers are installed in a dedicated rack 3 provided with a context information storage device 4. The context information storage device 4 is linked by a connection 7 to at least one computer 2 communicating with the avionics.

Each electrical distribution computer 1 comprises data processing means 1b and a non-volatile memory 1c in which a database is stored.

Similarly, each computer communicating with the avionics 2 comprises data processing means 2b and a non-volatile memory 2c in which a database is stored.

The context information storage device 4 also comprises a non-volatile memory 4c in which a database is stored.

FIG. 1 illustrates the case where all the computers operate normally. The non-volatile memories 1c, 2c and 4c thus contain the same database referenced A.

The context information storage device 4 of the electrical distribution system contains an image of the data stored in the different computers.

The fact of permanently storing, and therefore duplicating, the data contained in the different computers of the electrical distribution system makes it possible to have a real time faithful image of the complete context including the non-safety-related, safety-related and critical data.

In fact, it is possible to have a three-way vote mechanism between the distribution protection computer, the computer communicating with the avionics and the context information storage device. Depending on the type of computer not holding the same data as the other two, this computer receives a copy of the data from the context information storage device or from the computer communicating with the avionics.

For this, an updating device compares the data of the different computers and determines whether at least one computer does not contain the same data or the same database as that contained in the other computers. If such is the case, the updating device commands the copying of the data to the computer not containing the same data from another computer involved in the initial comparison.

Figure 2:
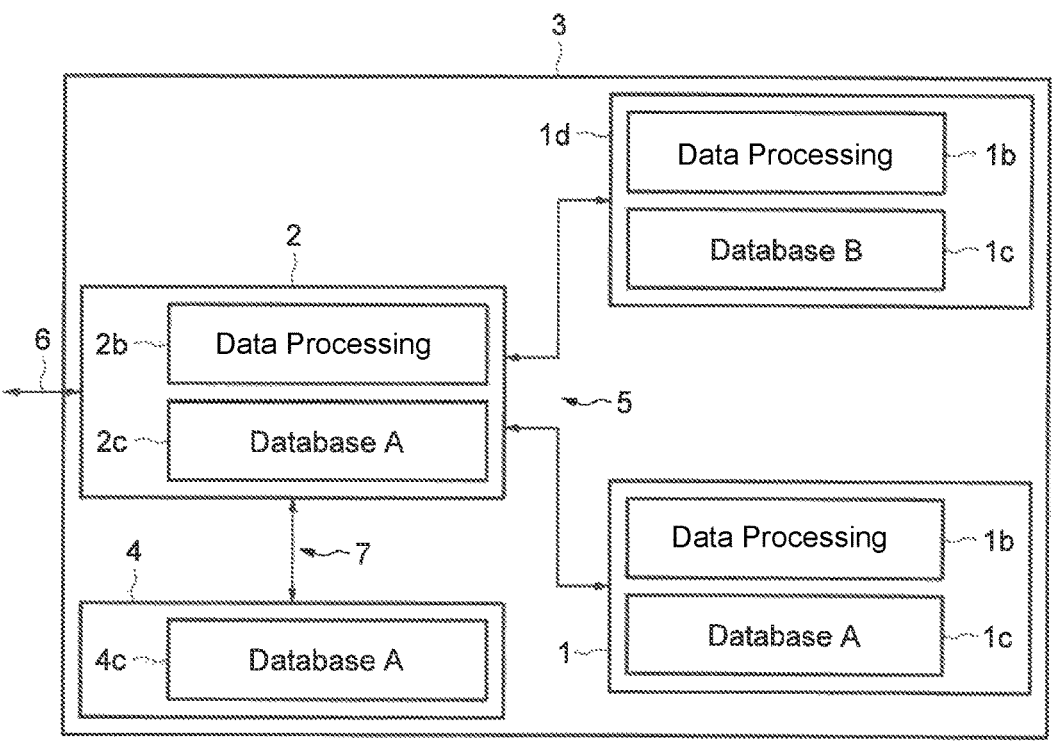
FIG. 2 illustrates an electrical energy distribution system in which an electrical distribution computer has been replaced.
Figure 3:
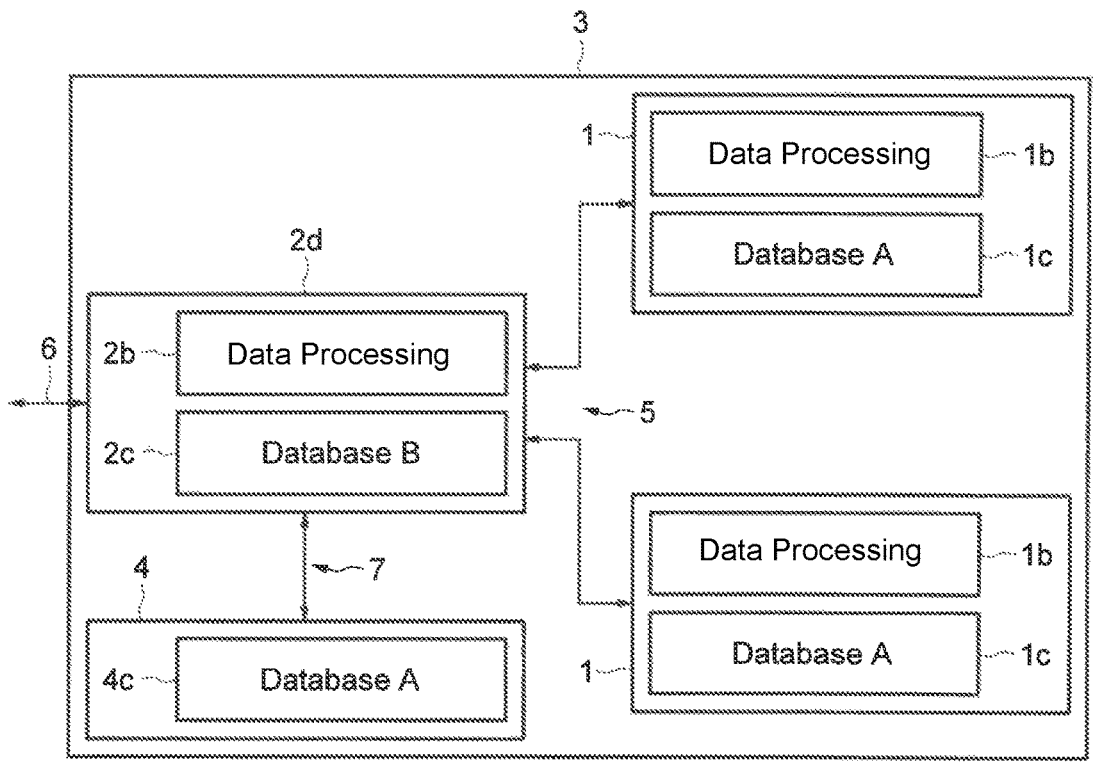
FIG. 3 illustrates an electrical energy distribution system in which a computer communicating with the avionics has been replaced.
Figure 4:
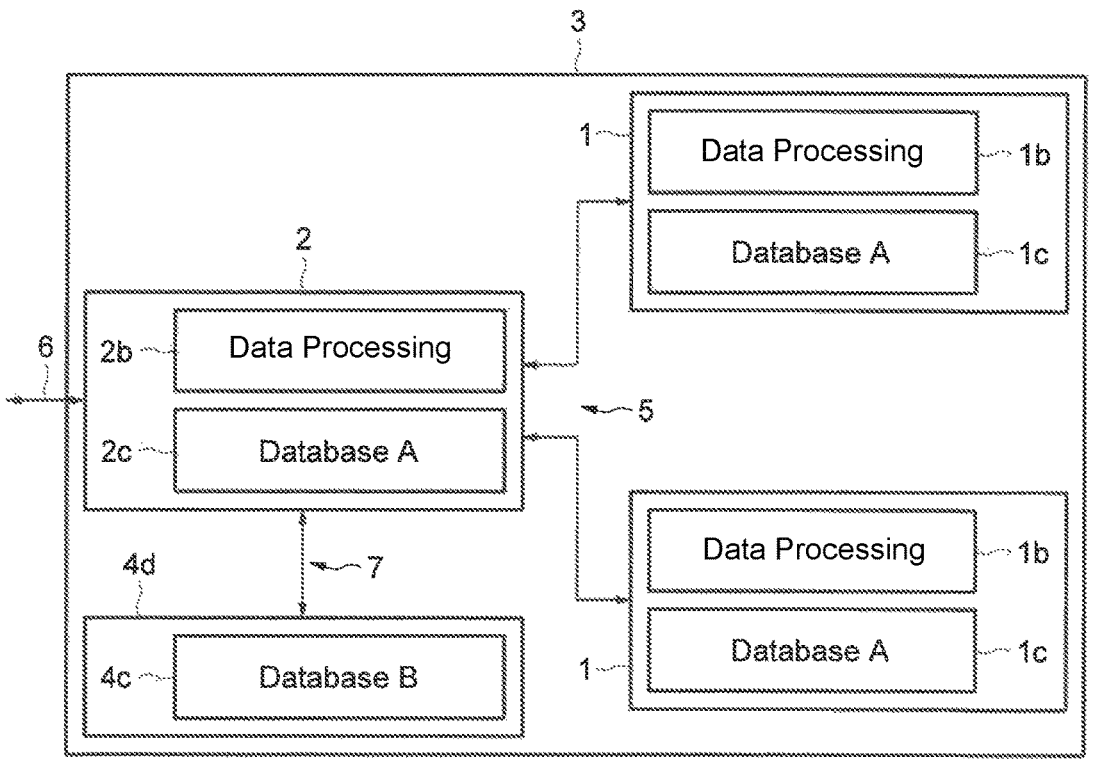
FIG. 4 illustrates an electrical energy distribution system in which a context information storage device has been replaced.

FIGS. 2 to 4 illustrate such situations. They are described in more detail below.

Moreover, it should be noted that the software part of the different computers generally comprises application software, and protection parameters, notably in database form.

The protection parameters comprise a definition of all the protection data, notably the electrical protections (rating, etc.) and their activation history (active/inactive, tripped). The protection parameters are stored in the computer communicating with the avionics and then are downloaded into the different electrical distribution computers.

FIG. 2 illustrates the case where an electrical distribution computer 1 has been exchanged with a new electrical distribution computer 1d not containing the same protection data, referenced database A.

The new electrical distribution computer 1d is structurally identical to the electrical distribution computers 1, but contains a database B that is different from the database A contained in the other electrical distribution computers 1.

The structure of FIG. 2 corresponds otherwise to that of FIG. 1.

In this case, the computer communicating with the avionics 2 and the context information storage device 4 have the same data, data which differ from those contained in the new electrical distribution computer 1d. The computer communicating with the avionics 2 downloads the data that it has stored, into the new electrical distribution computer 1d. If several new electrical distribution computers 1d were to be installed, the same operation would be reiterated for each new electrical distribution computer 1d.

FIG. 3 illustrates the case where the computer 2 communicating with the avionics has been replaced by a new computer 2d communicating with the avionics.

The new computer 2d communicating with the avionics is structurally identical to the computer 2 communicating with the avionics illustrated in FIGS. 2 and 3, but contains a database B different from the database A contained in the computer 2 communicating with the avionics illustrated in FIGS. 2 and 3.

In this case, it is specified that the electrical distribution computers 1 have not been exchanged and contain the same data, referenced database A, as the context information storage device 4.

The new computer communicating with the avionics 2d stores the data contained in the context information storage device 4.

FIG. 4 illustrates the case where the context information storage device 4 has been replaced by a new context information storage device 4d.

The new context information storage device 4d is structurally identical to the context information storage device 4 illustrated in FIGS. 2 to 4, but contains a database B different from the database A contained in the context information storage device 4 illustrated in FIGS. 2 to 4.

This can be done either by exchanging the storage device 4 itself, or by exchanging the rack 3.

In this case, it is specified that neither the electrical distribution computers 1 nor the computer 2 communicating with the avionics have been exchanged and contain the same data, referenced database A.

The new context information storage device 4d downloads the data contained in the computer 2 communicating with the avionics.

The computer 2 communicating with the avionics is preferred to the electrical distribution computers 1 because it has an overview of the status of the electrical distribution system.

The description has been produced in relation to electrical distribution computers. However, the system described can be applied to any other computer suitable for communicating with a computer 2 communicating with the avionics and/or a context information storage device 4.

Figure 5:
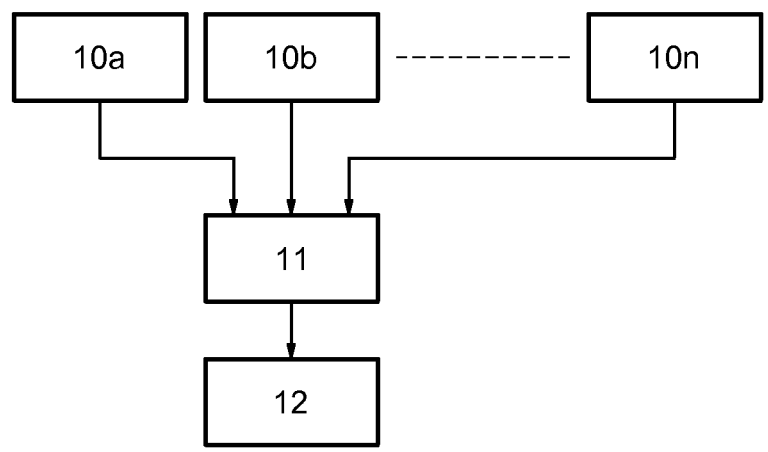
FIG. 5 illustrates the main steps of a method for controlling an electrical energy distribution system.

FIG. 5 illustrates the main steps of a method for controlling an electrical energy distribution system such as that described above.

The method begins with a step of determination (10a, 10b, . . . 10n) of the data of each computer. During a next step 11, the data of the computers are compared in order to determine if a computer contains different data from the other computers.

If such is the case, the method continues with a step 12, during which data are copied to the computer not containing the same data from another computer involved in the initial comparison.

More specifically, if it has been determined that the electrical distribution computer 1 has been exchanged with a new electrical distribution computer 1d not containing the same data as the other computers, the downloading of the data from the computer communicating with the avionics 2 into the new electrical distribution computer 1d is commanded. If several new electrical distribution computers 1d were to be installed, the same operation would be reiterated for each new electrical distribution computer 1d.

If it has been determined that the computer 2 communicating with the avionics has been replaced by a new computer 2d communicating with the avionics, and that the electrical distribution computers 1 have not been exchanged and contain the same data as the context information storage device 4, the downloading of the data is commanded from the context information storage device 4 into the new computer communicating with the avionics 2d.

If it has been determined that the context information storage device 4 has been replaced by a new context information storage device 4d and that neither the electrical distribution computers 1 nor the computer 2 communicating with the avionics have been exchanged, the downloading of the data is commanded from the computer 2 communicating with the avionics into the new context information storage device 4d.

The embodiments of the invention in which an exclusive property or privilege is claimed are defined as follows:

1. Method for controlling an electrical distribution system for an aircraft fitted with at least one electrical power supply line and at least one electrical protection,
   the electrical distribution system comprising:
   at least one computer connected to avionics computers of the aircraft comprising data processing means and a memory configured to store a copy of a database of protection parameters,
   an electrical distribution computer connected to the at least one computer connected to the avionics computers comprising data processing means and a memory configured to store a copy of the database of protection parameters, and a context information storage device, comprising a memory configured to store a copy of the database of protection parameters, the database of protection parameters defining electrical protections and their activation history for at least one electrical power supply line of the aircraft,
   wherein each of the at least one computer connected to the avionics computers of the aircraft, the at least one electrical distribution computer, and the context information storage device can be replaced,
   the method comprising:
   determining that the copy of the database stored in the memory of the context information storage device differs from the copies of the database stored in the memory of one of the at least one computer connected to the avionics computers and one of the at least one electrical distribution computer in a three-way vote mechanism, identifying the context information storage device as a new context information storage device based on the determining step, and in a case where the context information storage device has been replaced by the new context information storage device and neither the at least one electrical distribution computer nor the at least one computer connected to the avionics computers have been exchanged, copying the copy of the database from the at least one computer connected to the avionics computers into the new context information storage device.

2. Method according to claim 1, further comprising:

determining that the copy of the database stored in the memory of the one of the at least one electrical distribution computer differs from the copies of the database stored in the memory of the one of the at least one computer connected to the avionics computers and of the context information storage device in a three-way vote mechanism, identifying the one of the at least one electrical distribution computer as a new electrical distribution computer based on the determining step, in a case where the one of the at least one electrical distribution computer has been replaced by the new electrical distribution computer, and neither the one of the at least one computer connected to the avionics computers nor the context information storage device have been exchanged, copying the database from the one of the at least one computer connected to the avionics computers into the new electrical distribution computer.

3. Method according to claim 1, further comprising:

determining that the copy of the database stored in the memory of the one of the at least one computer connected to the avionics computers differs from the copies of the database stored in the memory of the one of the at least one electrical distribution computer and of the context information storage device in a three-way vote mechanism, identifying the one of the at least one computer connected to the avionics computers as a new computer connected to the avionics computers based on the determining step, in a case where the one of the at least one computer connected to the avionics computers has been replaced by the new computer connected to the avionics computers and neither the one of the at least one electrical distribution computer nor the context information storage device have been exchanged, copying the database from the context information storage device into the new computer connected to the avionics computers.

* * * * *